United States Patent
Aoki

(10) Patent No.: US 10,319,337 B2
(45) Date of Patent: Jun. 11, 2019

(54) INFORMATION PROCESSING DEVICE AND DISPLAY CONTROL METHOD FOR CALCULATING DATA TRANSFER RATES

(71) Applicant: FUJITSU CLIENT COMPUTING LIMITED, Kawasaki-shi, Kanagawa (JP)

(72) Inventor: Noriyuki Aoki, Kawasaki (JP)

(73) Assignee: Fujitsu Client Computing Limited (JP)

( * ) Notice: Subject to any disclaimer, the term of this patent is extended or adjusted under 35 U.S.C. 154(b) by 0 days.

(21) Appl. No.: 15/840,093

(22) Filed: Dec. 13, 2017

(65) Prior Publication Data

US 2018/0102105 A1 Apr. 12, 2018

Related U.S. Application Data

(63) Continuation of application No. PCT/JP2015/069858, filed on Jul. 10, 2015.

(51) Int. Cl.
*G09G 5/00* (2006.01)
*G06F 3/14* (2006.01)

(52) U.S. Cl.
CPC ........... *G09G 5/006* (2013.01); *G06F 3/1423* (2013.01); *G06F 3/1431* (2013.01); *G06F 3/14* (2013.01); *G09G 2320/0606* (2013.01); *G09G 2340/0407* (2013.01); *G09G 2350/00* (2013.01); *G09G 2352/00* (2013.01); *G09G 2354/00* (2013.01); *G09G 2360/04* (2013.01);
(Continued)

(58) Field of Classification Search
CPC ........... G09G 5/006; G09G 2340/0407; G09G 2350/00; G09G 2360/04; G09G 2370/22; G06F 3/1423
See application file for complete search history.

(56) References Cited

U.S. PATENT DOCUMENTS

2009/0182917 A1 7/2009 Kim
2010/0171746 A1 7/2010 Nagai
(Continued)

FOREIGN PATENT DOCUMENTS

JP 2001-352326 A 12/2001
JP 2003-125374 A 4/2003
(Continued)

OTHER PUBLICATIONS

"VESA® DisplayPort® Standard", Version 1, Revision 2a, Video Electronics Standards Association, May 23, 2012, pp. 1-554.
(Continued)

*Primary Examiner* — Barry Drennan
*Assistant Examiner* — Terrell M Robinson
(74) *Attorney, Agent, or Firm* — Harness, Dickey & Pierce, P.L.C.

(57) ABSTRACT

An information processing device capable of connecting to a display device using a function expansion unit includes a memory and a processor coupled to the memory. The processor is configured to: calculate a data transfer rate of the display device from a resolution to be used in the display device; and display, based on a data transfer rate at a given resolution calculated by the calculation unit, a ratio of the data transfer rate of the display device to an allowable data transfer rate, so as to be visibly recognized.

6 Claims, 16 Drawing Sheets

(52) U.S. Cl.
CPC ... *G09G 2370/045* (2013.01); *G09G 2370/10* (2013.01); *G09G 2370/22* (2013.01)

(56) References Cited

U.S. PATENT DOCUMENTS

| | | | |
|---|---|---|---|
| 2011/0234910 A1* | 9/2011 | Takayama | G06T 3/40 348/581 |
| 2013/0207942 A1 | 8/2013 | Imai et al. | |
| 2013/0215154 A1* | 8/2013 | Ponomarev | G06Q 10/06 345/672 |
| 2014/0032711 A1* | 1/2014 | Shimizu | H04W 40/08 709/217 |
| 2014/0104242 A1 | 4/2014 | Muntianu et al. | |
| 2014/0253566 A1* | 9/2014 | Chen | G09G 5/006 345/520 |
| 2014/0327685 A1 | 11/2014 | Lee et al. | |
| 2015/0249804 A1* | 9/2015 | Kasahara | G09G 5/006 345/205 |
| 2015/0334388 A1* | 11/2015 | Rabii | H04N 19/103 375/240.26 |

FOREIGN PATENT DOCUMENTS

| | | |
|---|---|---|
| JP | 2010-160304 A | 7/2010 |
| JP | 2013-120234 A | 6/2013 |
| JP | 2013-167699 A | 8/2013 |
| JP | 2015-55845 A | 3/2015 |

OTHER PUBLICATIONS

"VESA® DisplayPort® Standard", Version 1, Revision 2a, Errata Version 1, Video Electronics Standards Association, Feb. 2014, pp. 1-554.
International Search Report dated Oct. 6, 2015, issued in counterpart International Application No. PCT/JP2015/069858 (1 page).
Extended (supplementary) European Search Report dated May 30, 2018, issued in counterpart European Application No. 15898205.8. (9 pages).

* cited by examiner

FIG.5

| RESOLUTION | REFRESH RATE | PIXEL CLOCK FREQUENCY |
|---|---|---|
| 1024 × 768 | 60 Hz | 65.000 MHz |
| 1280 × 1024 | 60 Hz | 108.000 MHz |
| 1360 × 768 | 60 Hz | 85.500 MHz |
| 1600 × 900 | 60 Hz(RB) | 108.000 MHz |
| 1600 × 1200 | 60 Hz | 162.000 MHz |
| 1680 × 1050 | 60 Hz(RB) | 119.000 MHz |
| 1680 × 1050 | 60 Hz | 146.250 MHz |
| 1920 × 1080 | 60 Hz | 148.500 MHz |
| 1920 × 1200 | 60 Hz(RB) | 154.000 MHz |
| 1920 × 1200 | 60 Hz | 193.250 MHz |
| 1920 × 1440 | 60 Hz | 234.000 MHz |
| 2560 × 1600 | 60 Hz(RB) | 268.500 MHz |
| 2560 × 1600 | 60 Hz | 348.500 MHz |
| 4096 × 2160 | 60 Hz(RB) | 556.744 MHz |

FIG.6

Established Timing (offset address 23h, 24h, 25h)
Standard Timing 1 – 8 (offset address 26h – 35h)
1st Detailed Timing [Preferred Timing] (offset address 36h – 47h)
2nd Detailed Timing (offset address 48h – 59h)
3rd Detailed Timing (offset address 5Ah – 6Bh)
4th Detailed Timing (offset address 6Ch – 7Dh)

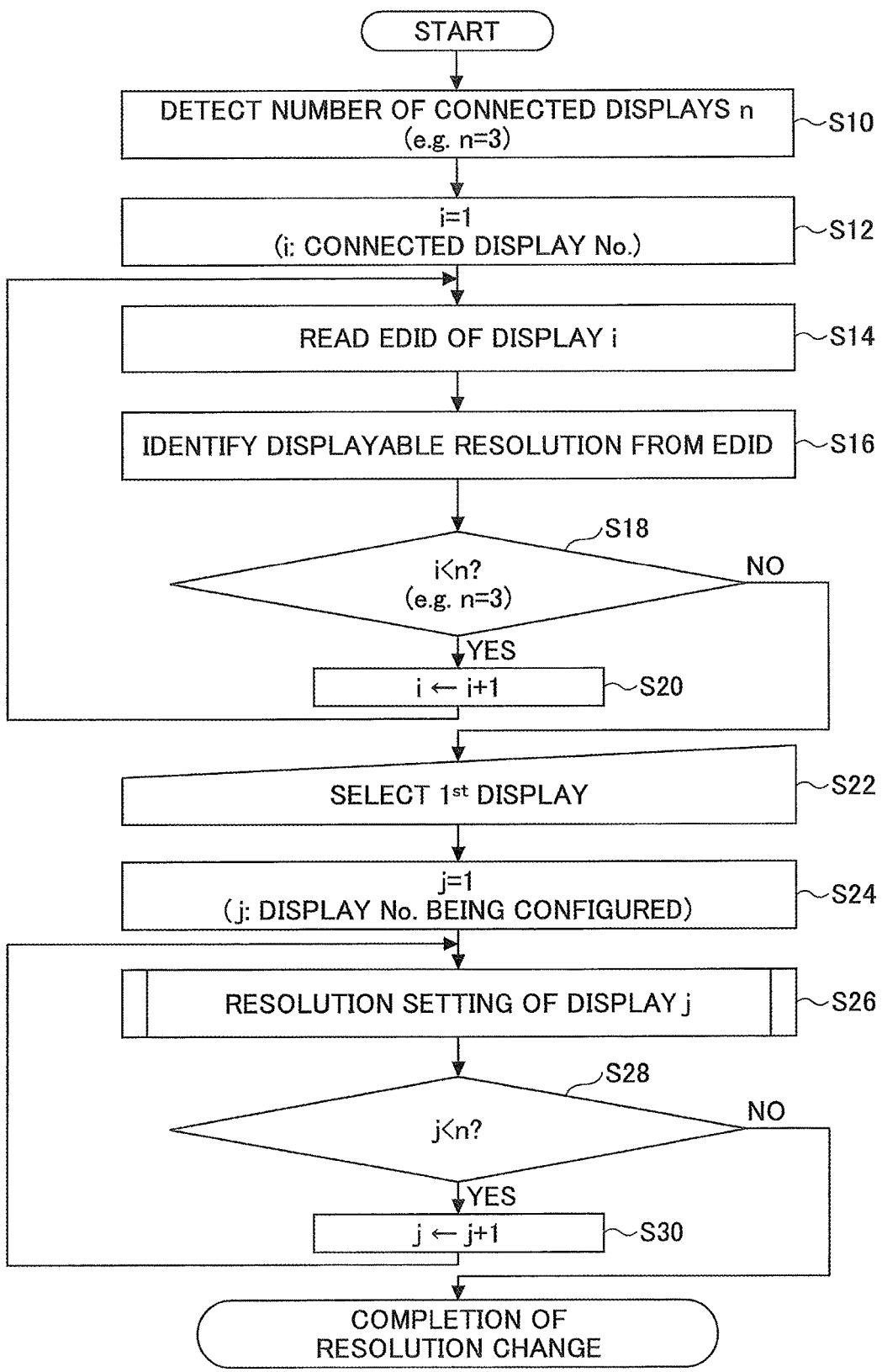

INFORMATION PROCESSING DEVICE AND DISPLAY CONTROL METHOD FOR CALCULATING DATA TRANSFER RATES

CROSS-REFERENCE TO RELATED APPLICATION

This application is a continuation application of International Application PCT/JP2015/069858 filed on Jul. 10, 2015 and designated the U.S., the entire contents of which are incorporated herein by reference.

FIELD

The embodiments discussed herein relate to an information processing device and a display control method.

BACKGROUND

In recent years, high resolution and high quality of images are displayed in a display device. For example, there is known a technique capable of achieving a high quality image display independent of a transfer capacity of a transfer means for transferring display data (see Japanese Laid-Open Patent Publication No. 2010-160304, for example).

Further, a multi-display setup is known. There are mainly two types of methods for a multi-display setup. In the first method, a PC (Personal Computer) is equipped with multiple connectors, and by connecting display devices to each connector, a multi-display setup is attained. In the second method, a PC equipped with single connector and a branch device connected to the connector of the PC are used. By connecting multiple display devices to the PC via the branch device, a multi-display setup is attained. In the second method, when the PC outputs display data of multiple streams, the branch device splits the display data of multiple streams, and transmits the splitted data to each display device respectively. Multi-Stream Transport (hereinafter referred to as "MST") supported by DisplayPort 1.2a (hereinafter represented as "DP1.2a") standardized by VESA is one of the specifications for implementing the second method.

The following is a reference document:
[Patent Document 1] Japanese Laid-Open Patent Publication No. 2010-160304.

SUMMARY

According to an aspect of the embodiments, there is provision for an information processing device capable of connecting to a display device using a function expansion unit. The information processing device includes: a calculation unit configured to calculate, from a resolution to be used in the display device, a data transfer rate of the display device; and a display controlling unit configured to display, based on a data transfer rate at a given resolution calculated by the calculation unit, a ratio of the data transfer rate of the display device to an allowable data transfer rate, so as to be visibly recognized.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 5 illustrates an example of a conversion table according to the embodiment;

FIG. 6 illustrates an example of EDID information according to the embodiment;

FIG. 9 is a flowchart describing an example of a resolution setting processing;

DESCRIPTION OF EMBODIMENT

Hereinafter, embodiments of the present disclosure will be described below with reference to the drawings. In the specification and drawings, with respect to elements having substantially the same function, the same reference symbol is attached and duplicate explanation is omitted.

<Overall Configuration of Display System>

Figure 1:
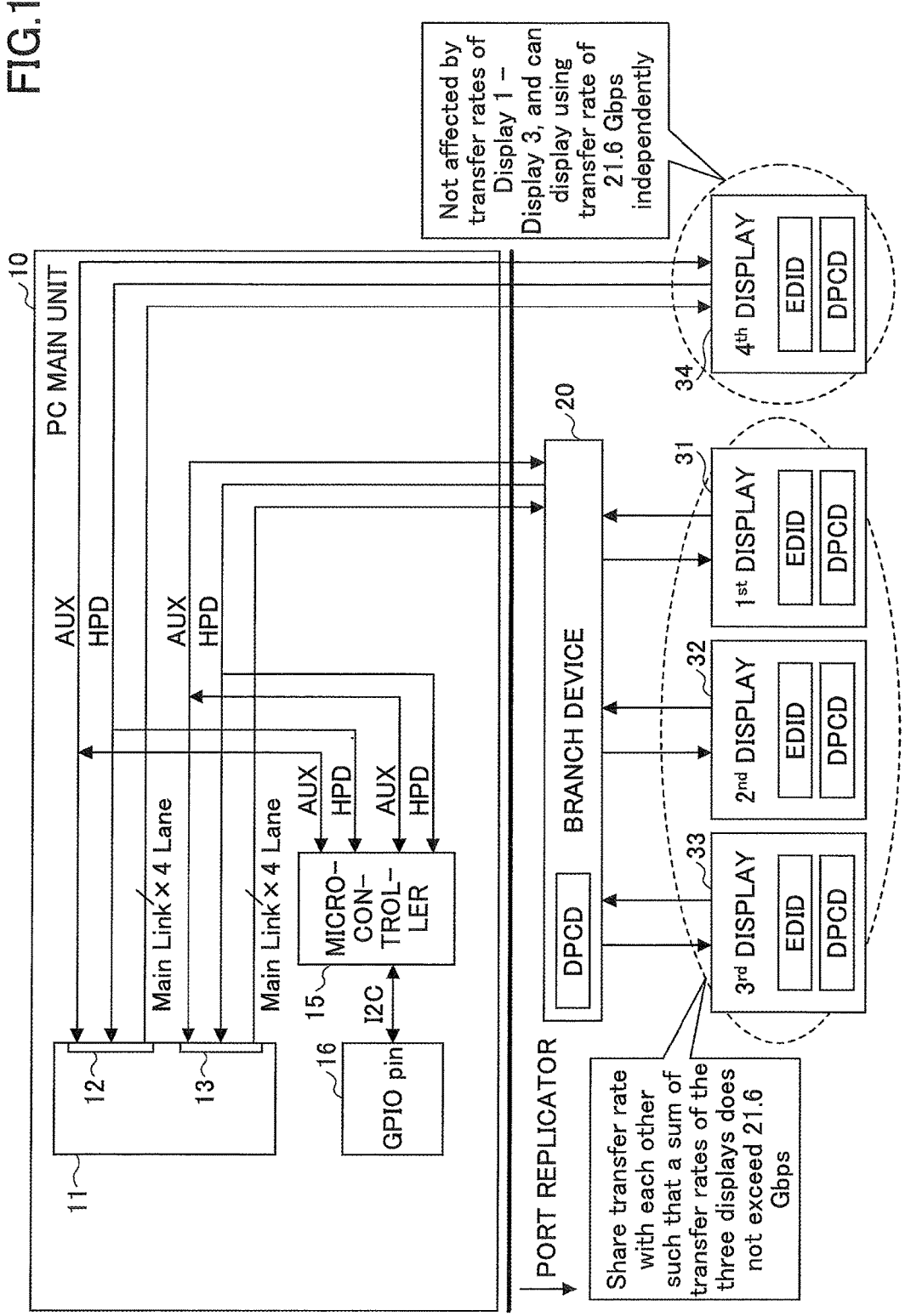
FIG. 1 is a diagram illustrating an overall configuration of a display system according to an embodiment.

First, a configuration of a display system according to an embodiment of the present disclosure will be described, with reference to FIG. 1. FIG. 1 is a diagram illustrating a display system according to the present embodiment. The display system displays information on the multiple display devices (hereinafter referred to as "displays") connected to an information processing device. In the present embodiment, a case will be explained in which an example of the information processing device is a personal computer (PC). However, the information processing device is not necessarily a PC, and other devices such as a tablet device may be used as the information processing device.

In MST, which is a mode supported in DP 1.2a standardized by VESA, a Source Device, a Branch Device, and a Sink Device are defined. For example, in FIG. 1, a PC main unit 10 corresponds to the Source Device. A function expansion unit, which is docked to the PC main unit 10, is an example of the Branch Device (branch device 20). The function expansion unit may be an external port replicator connected to the PC main unit 10, or may be embedded with the PC main unit 10.

An example of the Sink Device is a display connected to the branch device 20. In FIG. 1, as the Sink Devices, a first display 31, a second display 32, and a third display 33 are illustrated, all of which are connected to the branch device 20. In FIG. 1, a fourth display 34 is directly connected to an output port 12 of a graphic chip 11 inside the PC main unit 10. On the other hand, the first display 31, the second display 32, and the third display 33 are connected to an output port 13 of the graphic chip 11 via the branch device 20.

Among signal lines for connecting between the output port 12 of the graphic chip 11 and the fourth display 34, and between the output port 13 of the graphic chip 11 and the branch device 20, main link signal lines are used for transmitting display data to be displayed on the display. A data transfer rate of the main link is 5.4 Gbps (Gigabits per second) per lane. In the present embodiment, the main link includes 4 lanes, and a maximum data transfer rate is 21.6 (=5.4×4) Gbps.

As the fourth display 34 is connected to the PC main unit 10 independently, the fourth display 34 is not affected by the data transfer rates of the first, second, or third displays (31, 32, or 33), and can use a bandwidth of 21.6 Gbps for transferring display data. On the other hand, each of the first, second, and third displays (31 to 33) needs to be configured such that a sum of data transfer rates of the first to third displays (31 to 33) does not exceed 21.6 Gbps. Note that a data transfer rate corresponds to an available frequency when transferring display data. PBN which will be described later represents a peak bandwidth obtained by normalizing data transfer rate. That is, a value represented by PBN is proportional to data transfer rate.

An HPD signal line is used for sending and receiving a signal indicating whether a display is connected or not. When an HPD signal is changed from Low to High, it means that the corresponding display was connected. When an HPD signal is Low, it means that the corresponding display is not connected. An AUX signal line is used for sending and receiving control signals concerning communication between the graphic chip 11 and a display.

In the present embodiment, the PC main unit 10 is equipped with a microcontroller 15. The microcontroller 15 is connected to both the AUX signal lines associated with the output ports 12 and 13 respectively and to both the HPD signal lines associated with the output ports 12 and 13 respectively, so that the AUX signals and the HPD signals associated with the output ports 12 and 13 can be entered.

The microcontroller 15 monitors (performs snooping) communications between the graphic chip 11 and each display by using both the AUX signal line connected to the output port 12 and the AUX signal line connected to the output port 13, to obtain EDID (Extended Display Identification Data) information from the first display 31 to the fourth display 34. The microcontroller 15 can use a conventional method to perform snooping of the AUX signal. The EDID information includes display information of a screen such as a resolution.

The microcontroller 15 further obtains DPCD (Display Port Configuration Data) information which is retained in the branch device 20 and each display. The DPCD information includes information about data transfer, such as a data transfer rate and the number of lanes. The DPCD information retained in the branch device 20 includes data transfer rate between the branch device 20 and the graphic chip 11. The DPCD information retained in each display includes a data transfer rate between the branch device 20 and each display.

The graphic chip 11 is triggered with a change of the HPD signal from Low into High to start communication with the connected display. At the same time, the microcontroller 15 obtains the EDID information transmitted from the connected display to the graphic chip 11, and stores the EDID information into an internal memory of the microcontroller 15.

The microcontroller 15 obtains the DPCD information, and stores the DPCD information into the internal memory of the microcontroller 15. The microcontroller 15 may obtain the DPCD information (data transfer rate) retained in the branch device 20 via the AUX signal line before the display is connected, and store the DPCD information into the internal memory. Alternatively, the microcontroller 15 may obtain the DPCD information retained in each display after each of the display is connected, and store the DPCD information into the internal memory.

A configurable resolution display application, which will be described later, reads the EDID information and the DPCD information stored in the internal memory of the microcontroller 15 via I2C (I-squared-C), by using a GPIO pin 16.

Figure 2:
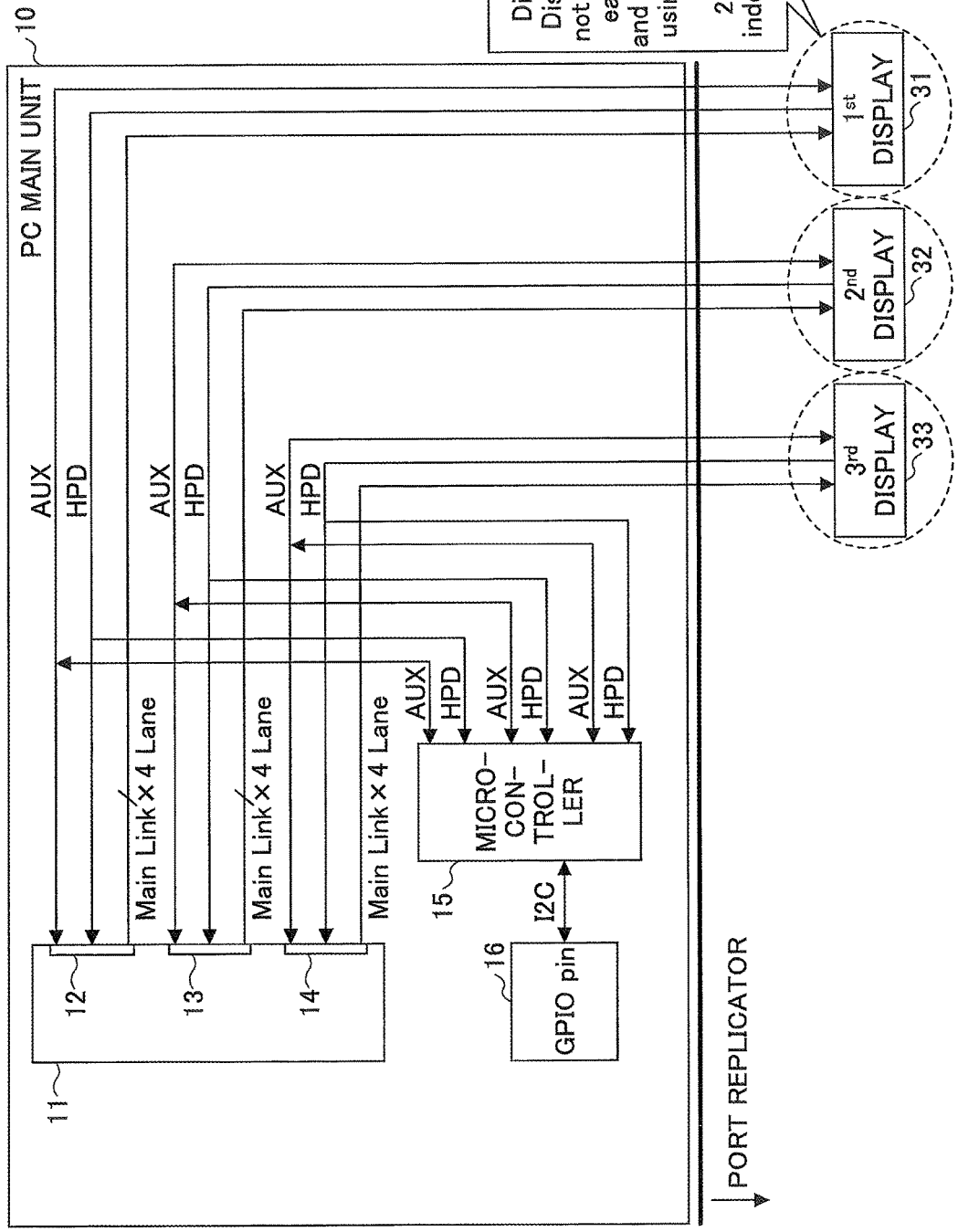
FIG. 2 is another diagram illustrating an overall configuration of a display system.

In FIG. 2, a first display 31 is connected to an output port 12 of a graphic chip 11. A second display 32 is connected to an output port 13 of the graphic chip 11. A third display 33 is connected to an output port 14 of the graphic chip 11. As each of the first display 31, the second display 32, and the third display 33 is connected to the PC main unit 10 independently, each display can use a data transfer rate of 21.6 Gbps for transferring display data.

In the display system illustrated in FIG. 2, each of the first display 31 to the third display 33 may be configured independently such that a data transfer rate of each display does not exceed 21.6 Gbps. In this case, a user can easily predict at what resolution each display can display. On the other hand, in the display system in FIG. 1, the first to third displays (31 to 33) need to be configured such that a sum of data transfer rates of the first to third displays (31 to 33) does not exceed 21.6 Gbps. In this case, configurable resolution ranges of each of the first display 31 to the third display 33 vary depending on the resolutions of other displays. Accordingly, the information processing device according to the present embodiment displays configurable resolution ranges of each of multiple displays connected to the branch device 20 in a visible manner.

<Hardware Configuration of Microcontroller>

Figure 3:
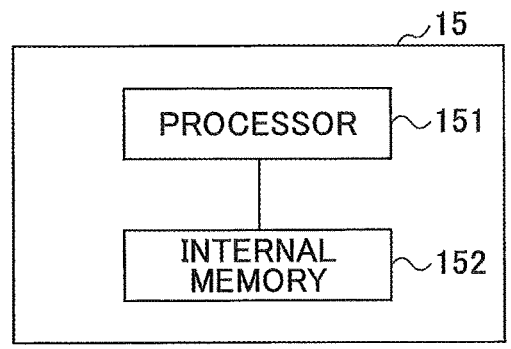
FIG. 3 is a diagram illustrating a hardware configuration of a microcontroller according to the embodiment.

An example of a hardware configuration of the microcontroller 15 provided in the information processing device according to the present embodiment is illustrated in FIG. 3. The microcontroller 15 includes a processor 151 and an internal memory 152. The processor 151 obtains the DPCD information by snooping into the AUX signal, thereby to obtain the data transfer rate and the number of the lanes (4 lanes in the present embodiment). When a data transfer rate per lane is 5.4 Gbps, data transfer at 21.6 Gbps can be attained using 4 lanes. When a data transfer rate per lane is 2.7 Gbps, data transfer at 10.8 Gbps can be attained using 4 lanes.

The processor 151 also obtains the EDID information to obtain information concerning display setting of a display, such as a resolution and the like. The internal memory 152 stores the EDID information and the DPCD information.

<Functional Configuration of Microcontroller>

Figure 4:
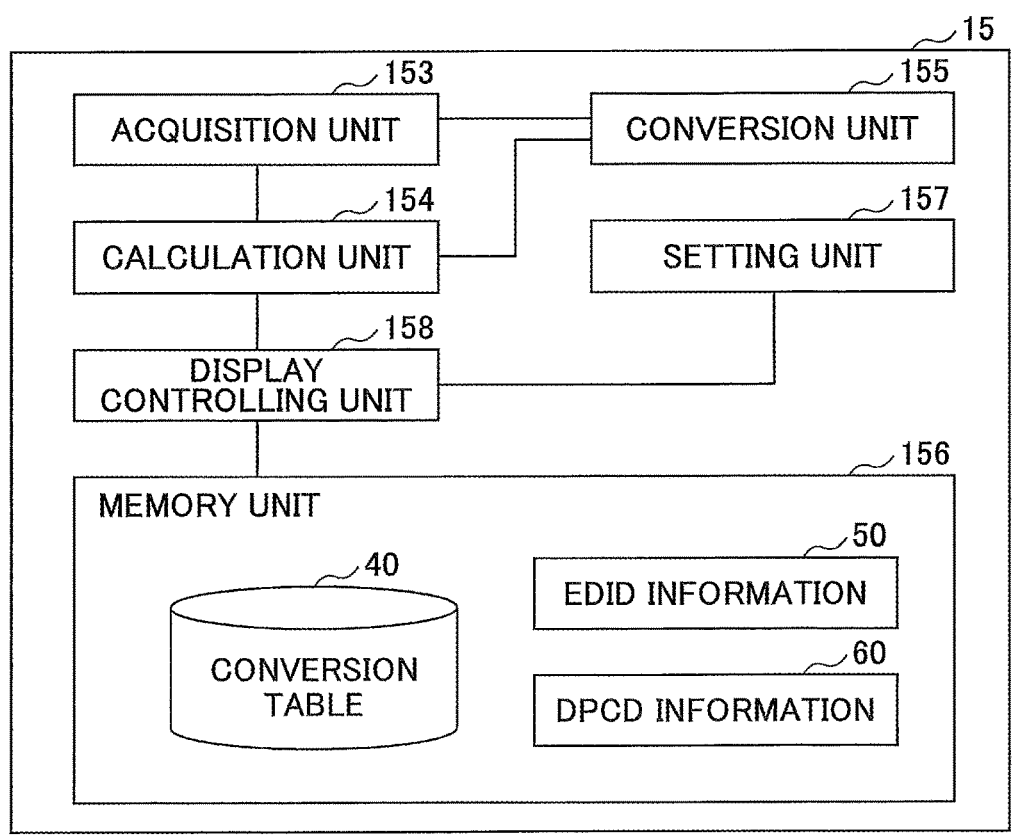
FIG. 4 is a diagram illustrating a functional configuration of the microcontroller according to the embodiment.

An example of a functional configuration of the microcontroller 15 according to the present embodiment is illustrated in FIG. 4. The microcontroller 15 includes an acquisition unit 153, a calculation unit 154, a conversion unit 155, a memory unit 156, a setting unit 157, and a display controlling unit 158.

The acquisition unit 153 acquires the DPCD information and the EDID information. The calculation unit 154 calculates a data transfer rate from a resolution used by a display. The conversion unit 155 converts a resolution into a pixel clock frequency by using a conversion table 40 of VESA standard, for example. The memory unit 156 stores the conversion table 40, EDID information 50, and DPCD information 60. The memory unit 156 may store a program for the configurable resolution display application. The setting unit 157 sets a resolution of a display.

When a certain resolution is to be used in a display, the display controlling unit 158 displays, based on a data transfer rate calculated from the certain resolution, a ratio of the data transfer rate to be used to an allowable data transfer rate, so as to be visibly recognized.

Note that the functions of the acquisition unit 153, the calculation unit 154, the conversion unit 155, the setting unit 157, and the display controlling unit 158 can be embodied by the processor. Also, the function of the memory unit 156 can be embodied by the internal memory 152.

FIG. 5 illustrates an example of the conversion table 40 according to the present embodiment. The conversion table 40 stores a resolution (display resolution) 41, a refresh rate 42, and a pixel clock frequency 43, each of which is correlated with each other. Based on the conversion table 40 in which the pixel clock frequencies 43 are defined in compliance with VESA standard, the conversion unit 155 can convert a set of the resolution 41 and the refresh rate 42 into the pixel clock frequency 43. The conversion unit 155 may perform conversion from only the resolution 41 into the pixel clock frequency 43. If specifications supporting more resolutions are publicized in future (such as DP 1.3, DP 1.3a, and the like), by adding newly supported resolutions to the conversion table 40 and updating the configurable resolution display application, the display system will be able to be adapted to the newly supported resolutions.

Regarding some resolutions 41, two types of mode may exist for the same resolution; a first mode adopting a display timing in which a pixel clock frequency is reduced by reducing a blanking interval (RB: Reduced Blanking), and a second mode adopting a display timing (CRT Timing) which does not reduce a blanking interval. Whether Reduced Blanking is used or CRT Timing is used can be detected by referring to the EDID information which is one of display information.

FIG. 6 illustrates an example of the EDID information 50 according to the present embodiment. The EDID information 50 according to VESA standard includes information about displayable resolutions of a display. If a display supports Reduced Blanking timing, a pixel clock frequency is necessarily stored in one of Detailed Timings located in address ranges from 36h to 7Dh. When information of the same resolution is stored in the Detailed Timing and the Standard Timing of the EDID information 50, or in the Detailed Timing and the Established Timing of the EDID information 50, the pixel clock frequency in the Detailed Timing (corresponding to Reduced Blanking) is applied. As for a resolution which is stored only in the Standard Timing or Established Timing, the pixel clock frequency corresponding to CRT timing is applied.

Figure 7:
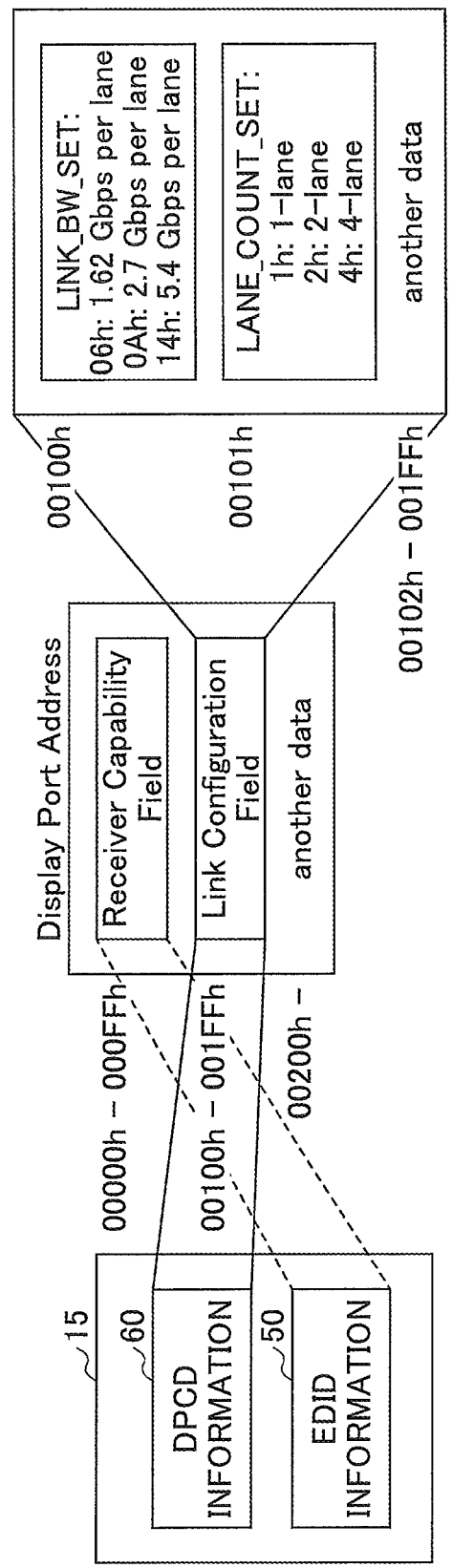
FIG. 7 illustrates an example of DPCD information according to the embodiment.

FIG. 7 illustrates an example of a storage region of the DPCD information 60 according to the present embodiment. The DPCD information 60 and the EDID information 50 are stored in the internal memory 152. Addresses from 00000h to 000FFh are Receiver Capability Field, and addresses from 00100h to 001FFh are Link Configuration Field.

The Link Configuration Field contained in addresses from 00100h to 001FFh of the internal memory 152 stores a data transfer rate. Further, at address 00101h, the number of lanes (Lane Count) is stored.

Figure 8A:
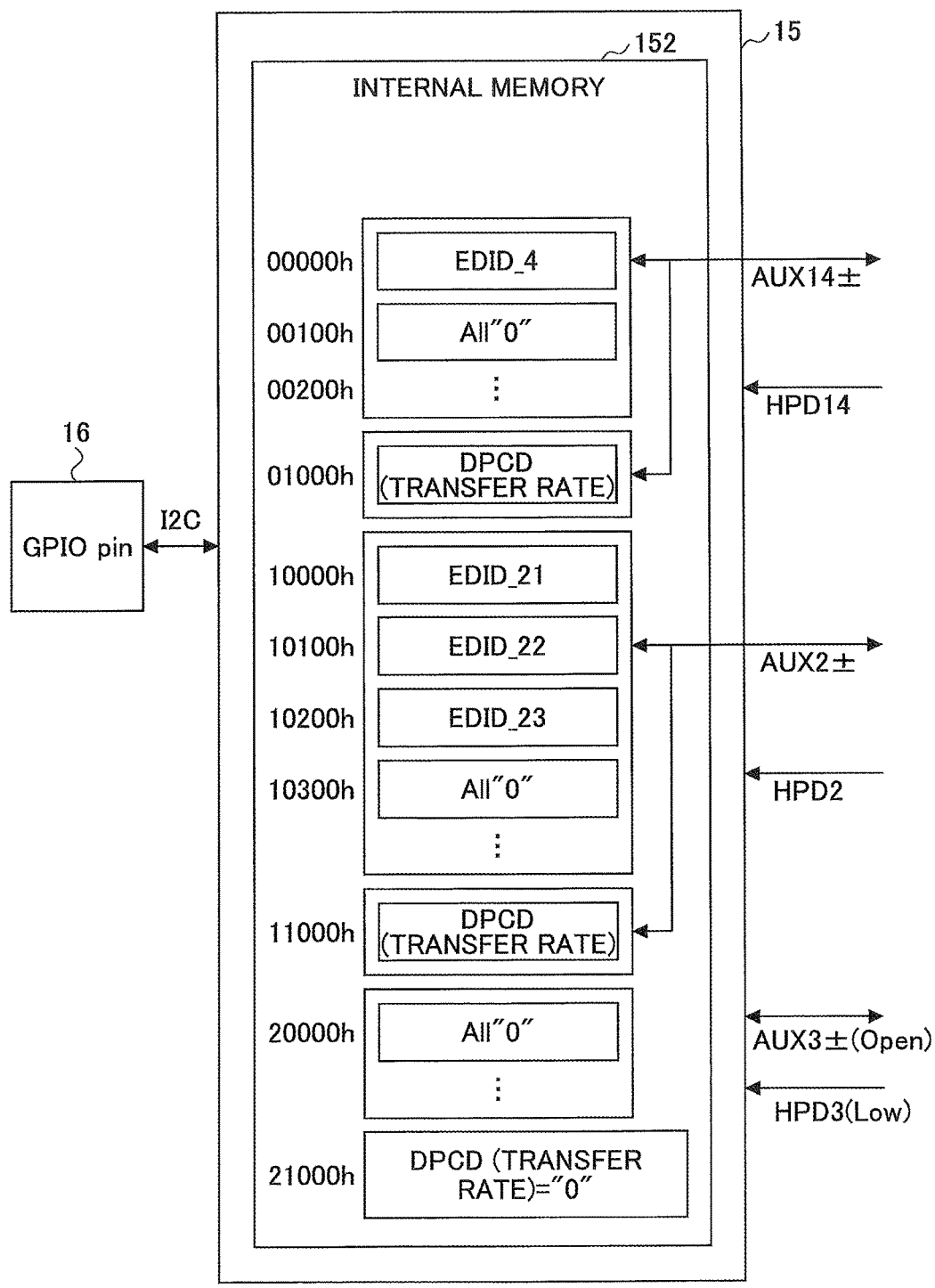
FIG. 8A illustrates an example of data stored in an internal memory of the microcontroller according to the embodiment.
Figure 8B:
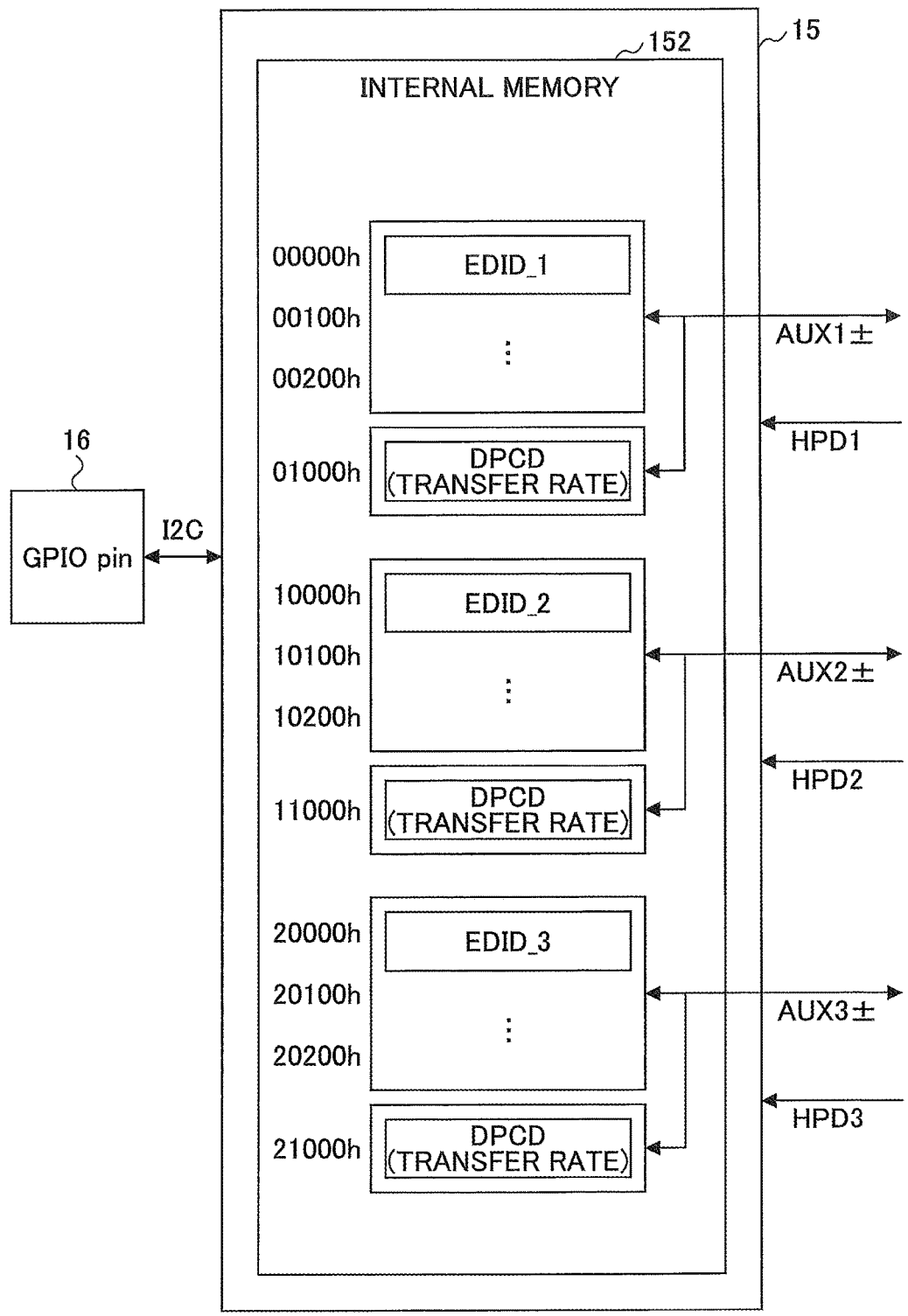
FIG. 8B illustrates an example of data stored in an internal memory of the microcontroller according to the embodiment.

Examples of data stored in the internal memory 152 of the microcontroller according to the present embodiment are illustrated in FIG. 8A and FIG. 8B. FIG. 8A illustrates an example of data stored in the internal memory 152 when the display system is configured such that the branch device 20 is used, as illustrated in FIG. 1. FIG. 8B illustrates an example of data stored in the internal memory 152 when the display system is configured such that the branch device 20 is not used, as illustrated in FIG. 2.

In FIG. 8A, information about the fourth display is stored from addresses 00000h to 01000h. Information about the fourth display includes the EDID information (EDID_4) and the DPCD (data transfer rate) of the fourth display. Note that an address (or address range) where "All "0"" is written represents that no data is stored in the address (or address range).

In the address range from 10000h to 11000h illustrated in FIG. 8A, information about the first, second, and third display is stored. For example, the EDID information of the first, second, and third displays (EDID_21, EDID_22, and EDID_23) and the DPCD (data transfer rate) are stored.

Presence or absence of the branch device 20, and the number of displays connected to the branch device 20 can be identified by the EDID information obtained from the corresponding AUX signal line. When the number of the EDID information stored in the internal memory 152 obtained via the AUX signal line is 1, it means that the branch device 20 does not exist. When the number of the EDID information is more than 1, it means that as many displays as the number of the EDID information are connected to the branch device 20.

According to the above, the example of the internal memory 152 illustrated in FIG. 8A represents that the branch device 20 exists and three displays are connected to the branch device 20. The example of the internal memory 152 illustrated in FIG. 8A also represents that a display (which is not connected to the branch device 20) is connected to a port independent of other displays. The example of the internal memory 152 illustrated in FIG. 8B represents that the branch device 20 does not exist and that three displays are respectively connected to ports independently. Note that contents of the internal memory 152 are updated for every access from the graphic chip 11.

As described above, whether the displays are independently connected or connected via the branch device 20 can be identified based on the number of the EDID information stored in the predetermined addresses of the internal memory 152. Also, based on the DPCD information stored in the predetermined addresses of the internal memory 152, data transfer rate can be identified.

Further, current resolution of each display and maximum displayable resolution of each display can be obtained from the EDID information. By using this information, configurable resolution display processing, which will be described later, can be realized.

Figure 10:
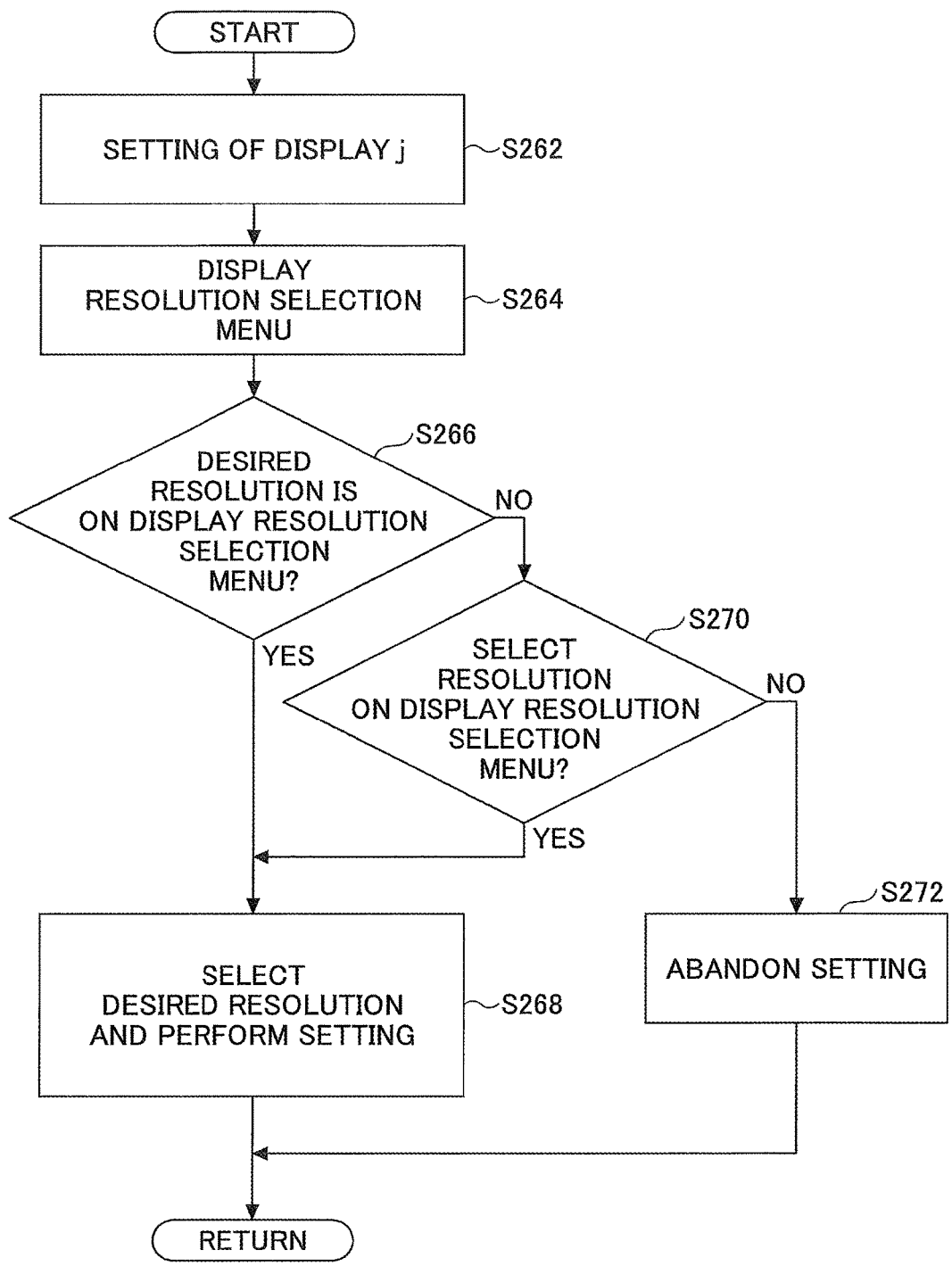
FIG. 10 is a flowchart describing an example of a resolution setting routine.

Before describing the configurable resolution display processing, an example of a resolution setting processing for the display system illustrated in FIG. 2 will be explained, with reference to FIGS. 9 and 10. After the explanation, the configurable resolution display processing according to the present embodiment, performed by, for example, the display system illustrated in FIG. 1, will be explained with reference to FIGS. 11A to 11C and FIG. 12. Lastly, with reference to FIGS. 13 to 15, examples of contents displayed on a screen by performing the configurable resolution display processing according to the present embodiment will be described.

<Resolution Setting Processing (Performed in the Display System Illustrated in FIG. 2)>

The display system illustrated in FIG. 2 does not include a branch device 20, and each of the first display 31, the second display 32, and the third display 33 is connected to the graphic chip 11 directly. In the resolution setting processing illustrated in FIG. 9, the processor 151 first detects the number of displays connected to the PC main unit 10 (step S10) (in the following description, the number is referred to as "n"). In the example illustrated in FIG. 2, n is 3.

Next, the processor 151 sets a variable i to 1 (step S12). The variable i represents a type of an identification number of the display currently connected. Next, the processor 151 reads the EDID information of a display corresponding to the variable i (if i=1, the display corresponding to the variable i is the first display) (step S14).

Next, the processor 151 identifies a displayable resolution of the first display (step S16). Next, the processor 151 determines whether the variable i is less than n (step S18). Here, as the variable i is 1, i is less than 3 (n). Hence, the processor 151 add 1 to the variable i (step S20), and the processing reverts to step S14. The processor 151 repeats the steps S14 to S20 until the variable i becomes not less than n at step S18. By performing the steps, displayable resolutions of the first through third displays are identified.

If it is determined that the variable i is not less than 3 (n) at step S18, the processing proceeds to step S22. A user selects, among the selectable displays (first, second, and third displays) which is displayed on the screen, one display. In the following description, a case in which the user selects the first display will be described. In response to the user's selecting operation, the processor 151 selects the first display (step S22). Next, the processor 151 sets a variable j to 1 (step S24). The variable j represents a display number of a display whose resolution is being set. What is described here is a case, in which a number "1" of the first display selected by the user is set to the variable j.

Next, the processor 151 executes a resolution setting routine for display j which will be described later (step S26). Next, the processor 151 determines whether the variable j is less than n (step S28). Here, as the variable j is 1, j is less than 3 (=n). Hence, the processor 151 adds 1 to the variable j (step S30), and the processing reverts to step S26. The processor 151 repeats the steps S26 to S30 until the variable j becomes not less than n at step S28. By performing the steps, resolutions of the first through third displays are set. When it is determined that the variable j is not less than 3 (=n) at step S28, the processor 151 decides that the setting of the displays completed and terminates the processing.

<Resolution Setting Routine>

The resolution setting routine which is called at step S26 in FIG. 9 will be described with reference to a flowchart illustrated in FIG. 10. When the resolution setting routine is called, the processor 151 selects display j (here, the first display is selected) (step S262). Next, the processor 151 displays a resolution selection menu (step S264). Next, the processor 151 determines whether a desired resolution is displayed on the resolution selection menu or not (step S266). If it is determined that the desired resolution is displayed on the resolution selection menu, the processor 151 select the desired resolution in accordance with an operation of the user, sets the resolution of the first display to the selected resolution (step S268), and terminates the routine. As a result of performing the routine, the resolution of the first display is set to 1920×1080 60 Hz 24 bpp, for example.

If it is determined that the desired resolution is not displayed on the resolution selection menu at step S266, the processor 151 determines whether the display is set to one of the resolutions existing in the resolution selection menu in accordance with an operation of the user (step S270). If it is determined that the display is set to one of the resolutions existing in the resolution selection menu in accordance with an operation of the user, the processor 151 selects the resolution from the resolution selection menu, sets the selected resolution to the first display (step S268), and terminates the routine. If it is determined that the display is not set to one of the resolutions existing in the resolution selection menu at step S270, the processor 151 abandons setting a resolution of the first display (step S272), and terminates the routine.

<Configurable Resolution Display Processing (Performed in the Display System Illustrated in FIG. 1)>

Figure 11A:
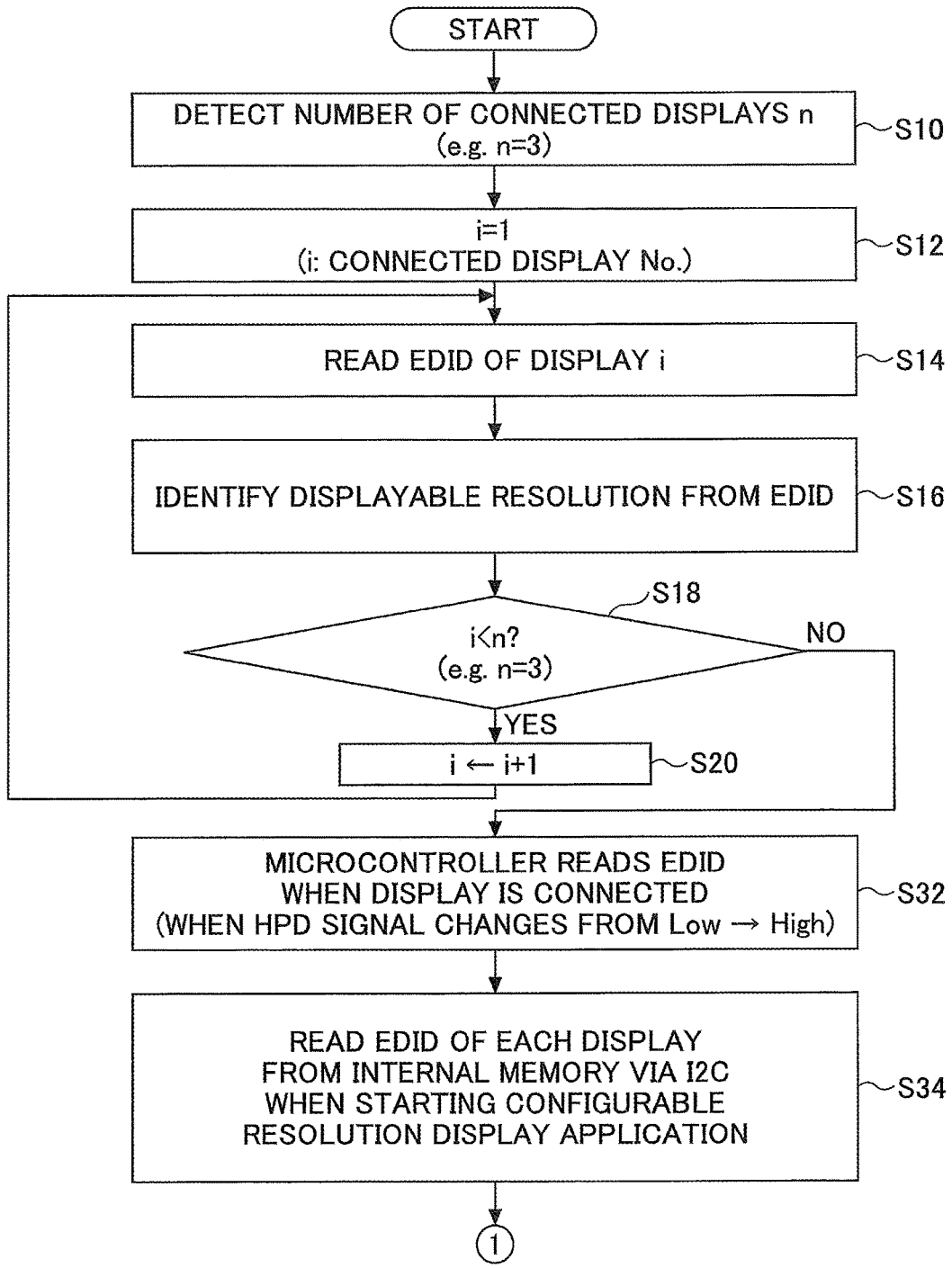
FIG. 11A is a flowchart illustrating an example of a process flow of the configurable resolution display processing according to the embodiment.
Figure 11B:
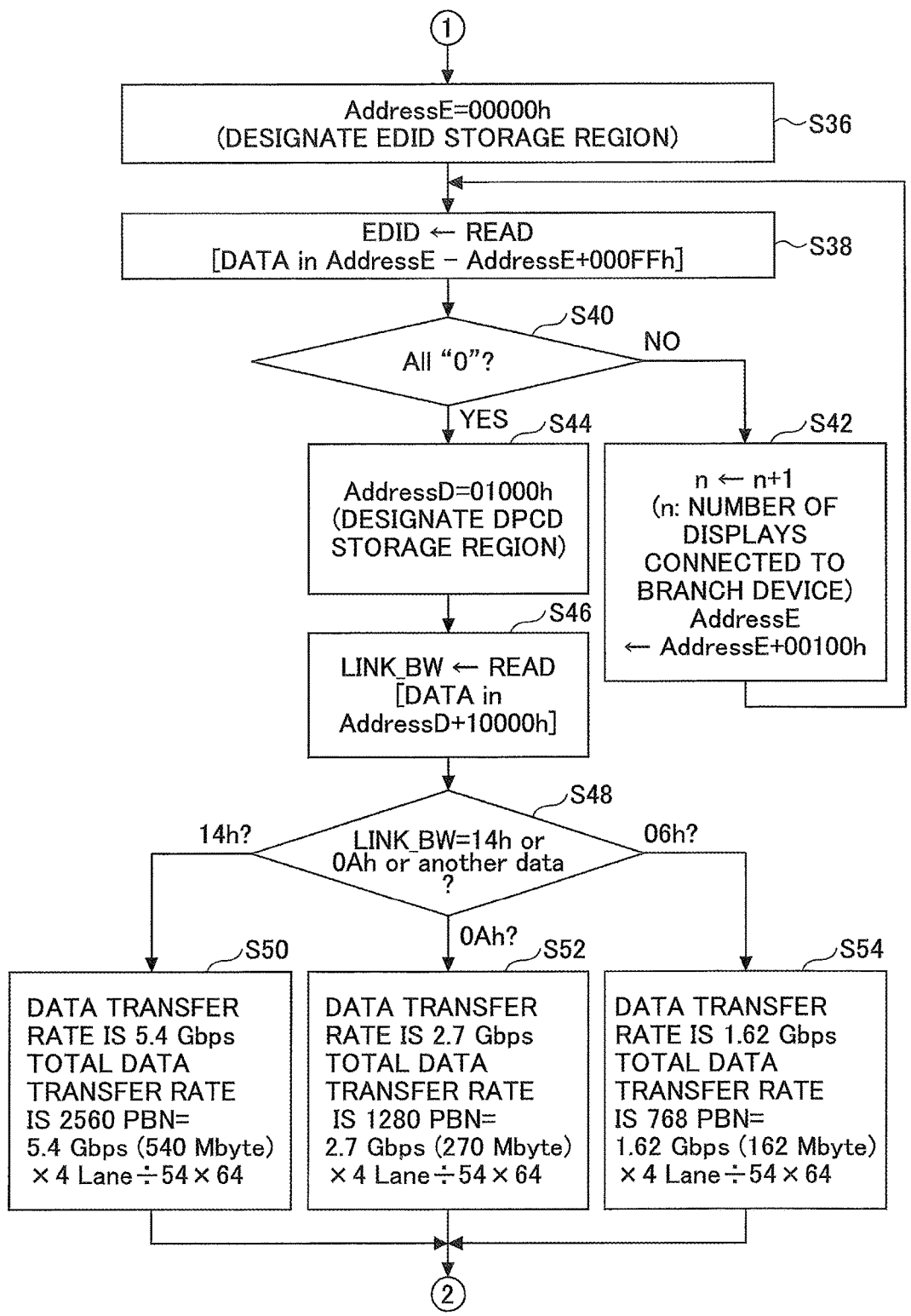
FIG. 11B is a flowchart illustrating an example of a process flow of the configurable resolution display processing according to the embodiment.
Figure 11C:
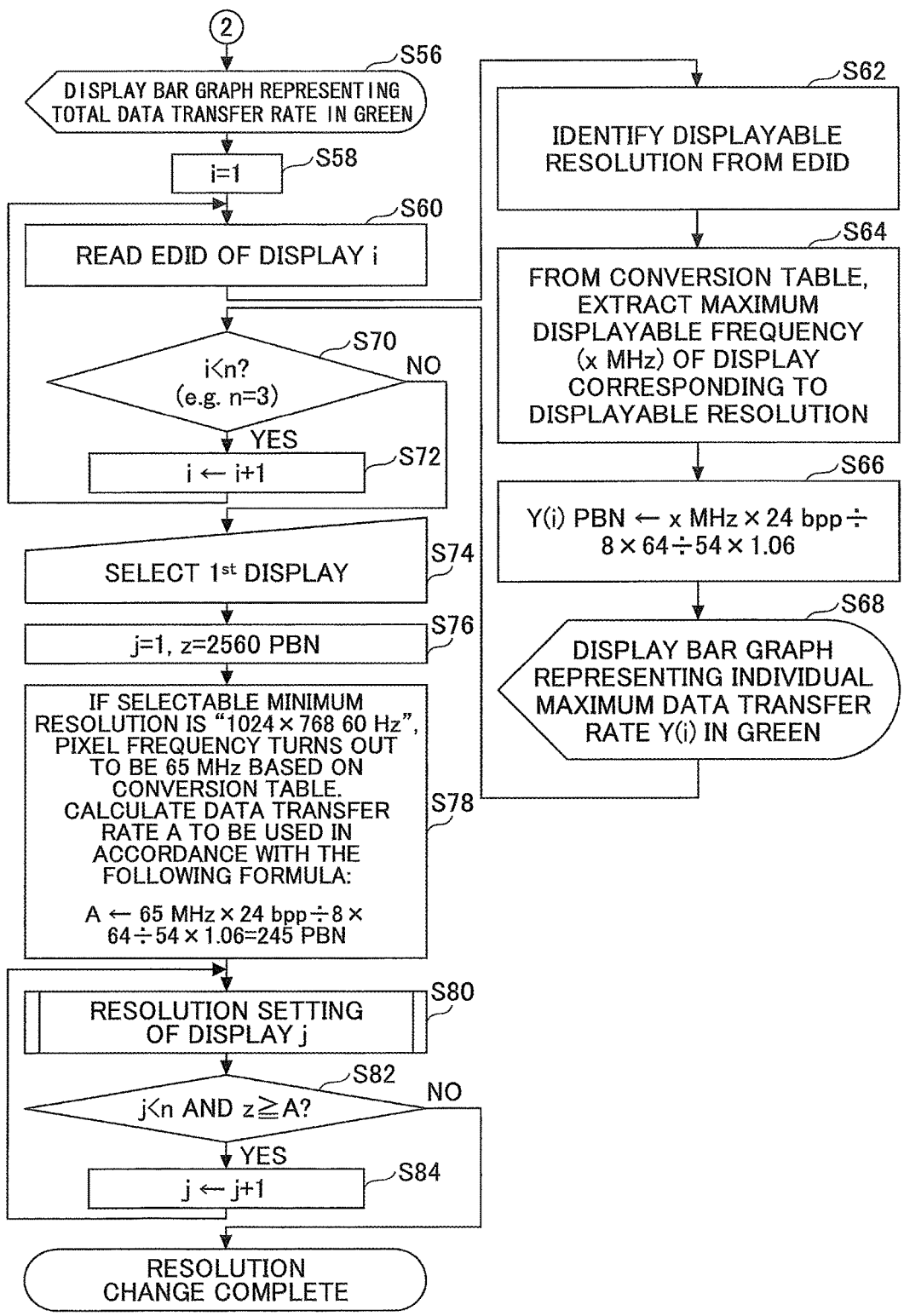
FIG. 11C is a flowchart illustrating an example of a process flow of the configurable resolution display processing according to the embodiment.
Figure 12:
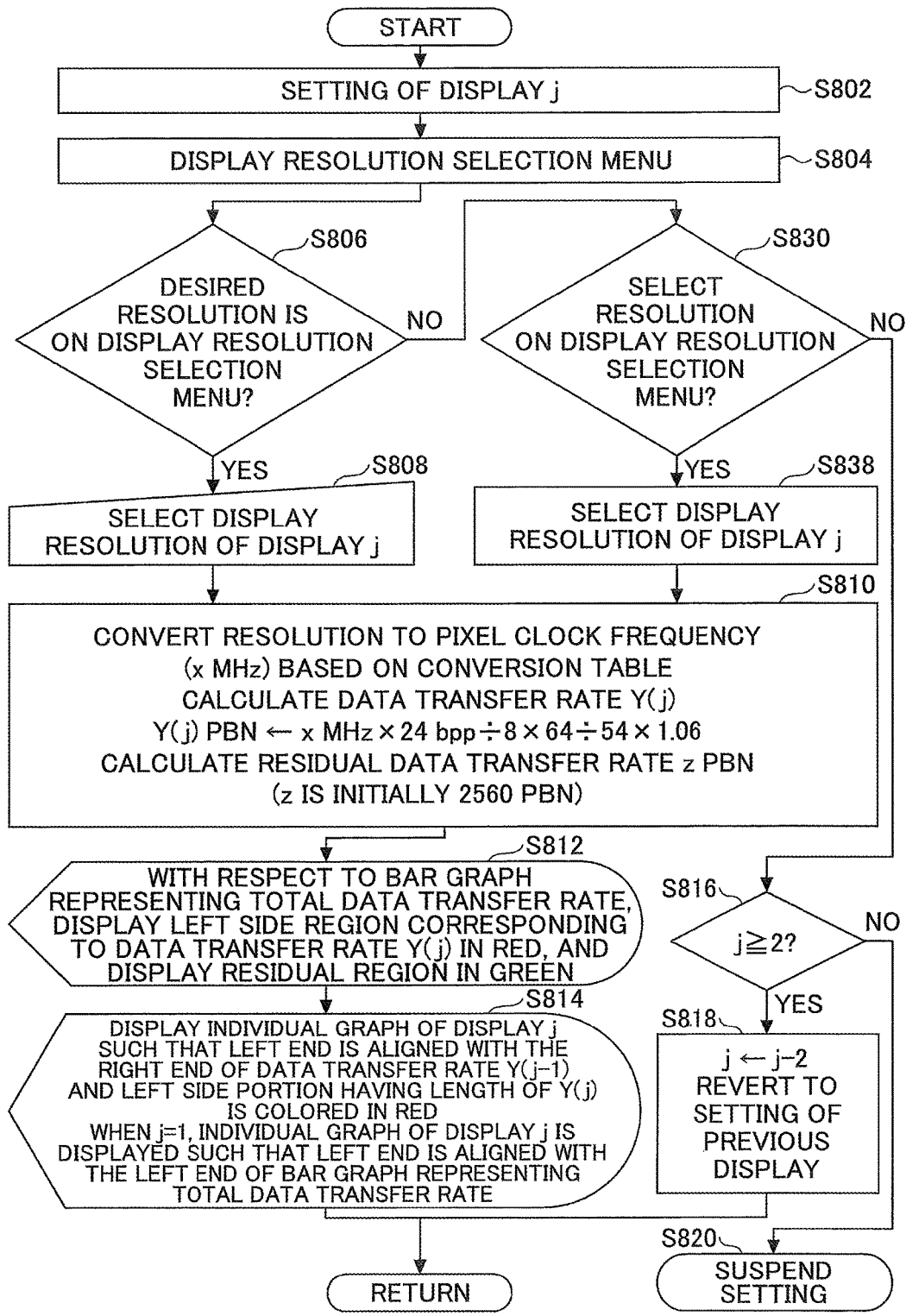
FIG. 12 is a flowchart describing an example of a resolution setting routine according to the embodiment.

Next, the configurable resolution display processing according to the present embodiment will be explained with reference to FIGS. 11A to 11C and FIG. 12. FIGS. 11A to 11C are a set of flowcharts illustrating an example of a process flow of the configurable resolution display processing according to the present embodiment. FIG. 12 is a flowchart illustrating an example of a process flow of a resolution setting routine according to the present embodiment.

When the processing illustrated in FIG. 11A starts, the acquisition unit 153 in the processor 151 performs steps S10 through S20. Since these steps are the same as the steps S10 through S20 illustrated in FIG. 9 and are already explained, the description of these steps is omitted.

Next, the acquisition unit 153 reads the EDID information retained in a display in response to a change of the HPD signal which changes from Low to High when the display is connected (step S32). Next, when the configurable resolution display application starts, the acquisition unit 153 reads EDID information of each display from the internal memory 152 via I2C (step S34). After step S34, the processing proceeds to "1" in FIG. 11B).

At step S36 following "1" in FIG. 11B, the acquisition unit 153 sets AddressE to 00000h, to designate a storage region for the EDID information in the internal memory 152 (step S36). Next, the acquisition unit 153 obtains data stored in an address range from AddressE to (AddressE+000FFh) as the EDID information (step S38). By performing these steps, the EDID information 50 stored in the "Receiver Capability Field" in the internal memory 152 illustrated in FIG. 7 is obtained.

Next, the acquisition unit 153 determines whether the designated region is "All "0"" (no information is stored) or not (step S40). If it is determined that the designated region is not "All "0"", the acquisition unit 153 adds a variable n to 1, and adds the AddressE to 100h, to designate a storage region for the EDID information of the second display connected to the branch device 20 (step S42). The acquisition unit 153 again performs step S38 to obtain data stored in an address range from AddressE to (AddressE+000FFh) as the EDID information of the second display (step S38).

Steps S38 to S42 are repeatedly executed until it is determined that the designated region is "All "0"" at step S40. By repeating these steps, the EDID information of the first to third displays is obtained.

When it is determined that the designated region is "All "0"" at step S40, the acquisition unit 153 sets AddressD to 01000h to designate a storage region for the DPCD information in the internal memory 152 (step S44). Next, the acquisition unit 153 obtains a part of the DPCD information stored in an address of AddressD+00100h, and stores the information to LINK_BW (step S46). By performing these steps, the DPCD information stored in the "Link Configuration Field" in the internal memory 152 illustrated in FIG. 7 is obtained. When the value stored in the LINK_BW is 06h, it means that the data transfer rate is 1.62 Gbps. When the value is 0Ah, it means that the data transfer rate is 2.7 Gbps. When the value is 14h, it means that the data transfer rate is 5.4 Gbps.

Next, the acquisition unit 153 determines whether the LINK_BW is 14h, 0Ah, or 06h (step S48). If it is determined that the LINK_BW is 14h, the acquisition unit 153 determines that a data transfer rate per lane is 5.4 Gbps and that a total data transfer rate z is 2560 PBN (=5.4 Gbps (540 Mbytes)×4 lanes 54×64) (step S50). After step S50, the processing proceeds to "2" in FIG. 11C.

When the data transfer rate of 5.4 Gbps (per lane) is expressed in units of PBNs, the total usable data transfer rate is expressed as 2560 PBN (=5.4 Gbps (540 Mbytes)×4 lanes 54×64). In the DP 1.2a specification, when distributing display data consisting of multiple stream data via the branch device 20, the usable data transfer rate is expressed in units of PBNs (Payload Bandwidth Numbers). One unit of PBN is 54/64 (Mbytes/sec).

If it is determined that the LINK_BW is 0Ah, the acquisition unit 153 determines that the data transfer rate per lane is 2.7 Gbps and that the total data transfer rate z is 1280 PBN (=2.7 Gbps (270 Mbytes)×4 lanes 54×64) (step S52). After step S52, the processing proceeds to "2" in FIG. 11C.

If it is determined that the LINK_BW is 06h, the acquisition unit 153 determines that the data transfer rate per lane is 1.62 Gbps and that the total usable data transfer rate z is 768 PBN (=1.62 Gbps (162 Mbytes)×4 lanes 54×64) (step S54). After step S54, the processing proceeds to "2" in FIG. 11C.

Figure 13:
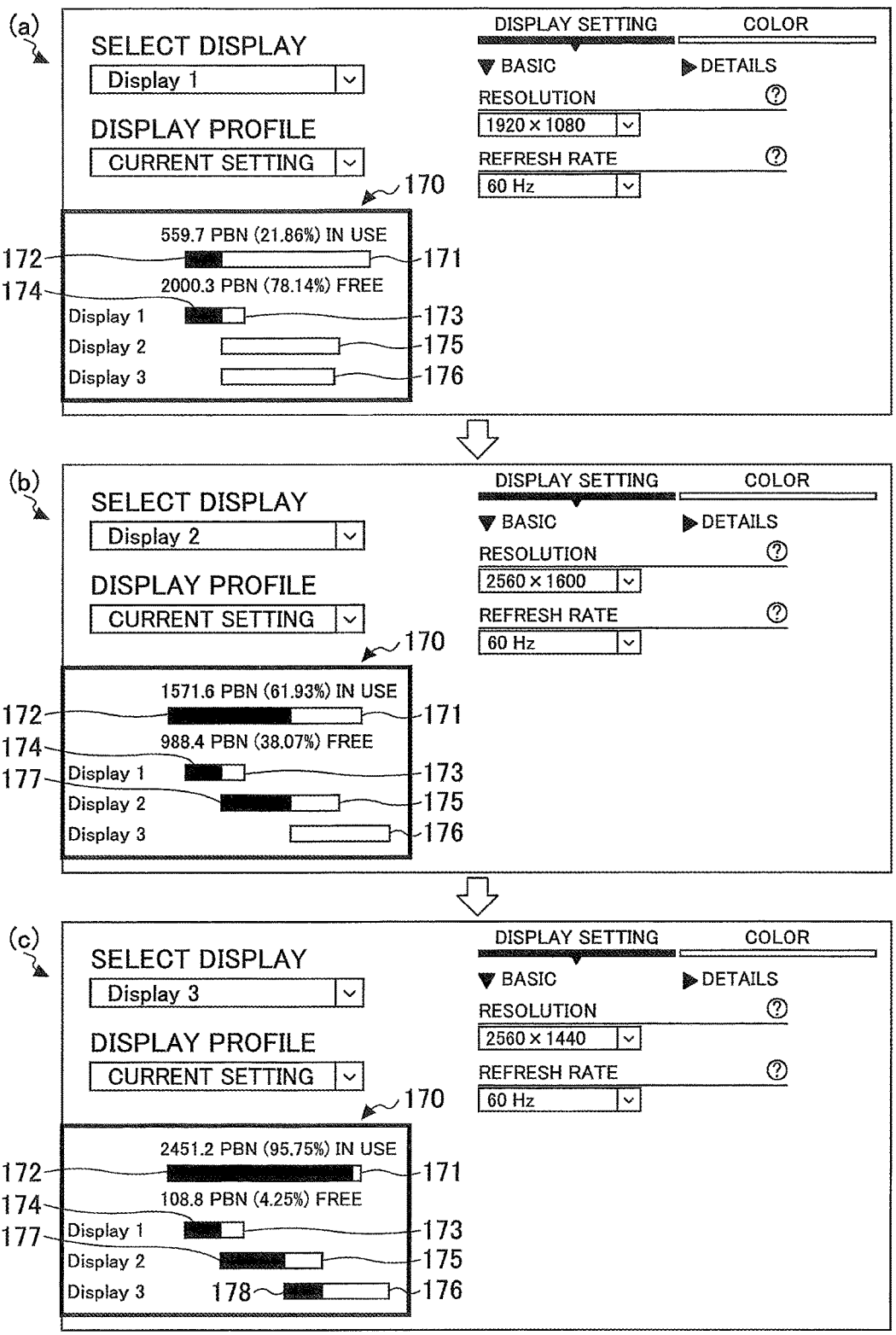
FIG. 13 is a view illustrating an example of a display screen according to the embodiment.

At step S56 following "2" in FIG. 11C, the display controlling unit 158 displays a bar graph representing the total data transfer rate in green. Displayable total pixel rate is determined in advance, and a maximum total data transfer rate corresponding to the total pixel rate is 21.6 Gbps when using MST in DP 1.2a. At the time when a display resolution of the first display is to be selected, the data transfer rate of 21.6 Gbps regulated in DP 1.2a is in an unused state. Accordingly, since a usable data transfer rate at this point of time is 2560 PBN, which is a maximum data transfer rate, the display controlling unit 158 displays a bar graph representing the total data transfer rate of 2560 PBN in green. For example, in a PBN display region 170 in a screen "(a)" illustrated in FIG. 13, a bar graph 171 representing the total data transfer rate of 2560 PBN is displayed in green (note: in the drawings, a white box is used instead of green). Though a red (black is used in the drawings instead of red) portion 172 is illustrated in FIG. 13, the portion 172 is not displayed in red color and is displayed in green when step S56 is executed.

Next, the acquisition unit 153 sets a variable i to 1 (step S58). Next, the acquisition unit 153 reads the EDID information of the i-th display (step S14). When i=1, the i-th display is the first display.

Next, the calculation unit 154 identifies a displayable resolution of the first display from the EDID information (step S62). Next, the calculation unit 154 converts the displayable resolution into a pixel clock frequency based on the conversion table 40 to identify a maximum displayable frequency (xMHz) of the first display (step S64).

Next, the calculation unit 154 calculates an allowable data transfer rate to be used by the first display Y(1) PBN, based on a formula (1) described below (step S66). When calculating a data transfer rate to be used, in the present embodiment, calculation is performed by adding a margin of 0.6%. Thus, the data transfer rate to be used is obtained by multiplying an actual data transfer rate (PBN) by 1.06.

$$Y(i) \text{ PBN} \leftarrow x\text{MHz} \times 24 \text{ bpp} \div 8 \times 64 \div 54 \times 1.06 \qquad (1)$$

If a resolution of the first display is set to "1920×1080 60 Hz 24 bpp", the pixel clock frequency corresponding to the resolution is identified as 148.5 MHz based on the conversion table 40, and the data transfer rate to be used is calculated as 559.7 PBN (=148.5 MHz×24 bpp÷8×64÷54× 1.06), based on the formula (1). The display controlling unit 158 displays a bar graph representing the calculated individual data transfer rate Y(1) PBN having a length of "559.7 PBN" in green (step S68). By performing step S68, in a PBN display region 170 in the screen "(a)" illustrated in FIG. 13, for example, a bar graph 173 representing the maximum data transfer rate of the first display having a length of 559.7 PBN is displayed in green. Though a red (black) portion 174 is illustrated in FIG. 13, the portion 174 is not displayed in red color and is displayed in green when step S68 is executed.

Next, the acquisition unit 153 determines whether the variable i is less than n (step S70). Here, as the variable i is 1, i is less than 3 (=n). Hence, the processor 151 adds 1 to the variable i (step S72), and the processing reverts to step S60. The processor 151 repeats steps S60 to S68 until the variable i becomes not less than 3. By repeating the steps, maximum data transfer rates of the second and the third displays are identified.

Based on the calculation of the data transfer rate which can be used for the first display, a data transfer rate which can be used for the second display is calculated as 2000.3 PBN (=2560 PBN−559.7 PBN). Next, if a resolution of the second display is set to "2560×1600 60 Hz (Reduced Blanking) 24 bpp", the conversion unit 155 obtains, based on the conversion table 40, the pixel clock frequency corresponding to the resolution as "268.5 MHz", by converting "2560× 1600 60 Hz (RB)". When the pixel clock frequency "268.5 MHz" is converted to PBN by substituting "268.5 MHz" in the above formula (1), 1011.9 PBN (=268.5 MHz×24 bpp÷8×64 54×1.06) is obtained.

The display controlling unit 158 displays a bar graph representing the calculated individual data transfer rate of the second display Y(2) PBN having a length of "1011.9 PBN" in green (step S68). As a result, on a PBN display region 170 in the screen "(a)" illustrated in FIG. 13, for example, a bar graph 175 representing the maximum data transfer rate of the second display having a length of 1011.9 PBN is displayed in green.

When the maximum data transfer rates of the first display and the second display are determined as 559.7 PBN and 1011.9 PBN respectively, an available data transfer rate for the third display is 988.4 PBN (=2000.3 PBN−1011.9 PBN). Hence, on a PBN display region 170 in the screen "(a)"

illustrated in FIG. 13, for example, a bar graph 176 representing the maximum data transfer rate of the third display having a length of 988.4 PBN is displayed in green.

By calculating back a pixel clock frequency using the calculated data transfer rate and the formula (1), a maximum pixel clock frequency which can be used by the third display turns out to be 262.2 MHz (=988.4 MHz÷1.06×54÷64×8÷24). When the pixel clock frequency is equal to 262.2 MHz or less, a maximum displayable resolution turns out to be 1920×1440 60 Hz (234 MHz), based on the conversion table 40. Therefore, it is determined that a resolution of "1920×1440 60 Hz" or less can be used for the third display.

Next, at step S70, the acquisition unit 153 determines that the variable i (=3) is equal to n (=3), and the user selects one of the first through third displays using the menu. In the following description, a case in which the user selects the first display will be explained. The calculation unit 154 selects the first display in accordance with the user's operation (step S74). Next, the calculation unit 154 sets a variable j to 1, and sets a variable z (z represents a usable data transfer rate) to 2560 PBN (=5.4 Gbps (540 Mbytes)×4 lanes×64÷54) (step S76).

Next, the calculation unit 154 calculates a data transfer rate A to be used when a minimum usable resolution is selected. Specifically, a pixel clock frequency corresponding to the minimum usable resolution is obtained by referring to the conversion table 40. By substituting the obtained pixel clock frequency in the formula (1), the data transfer rate A is obtained. When the minimum usable resolution is "1024×768 60 Hz", the pixel clock frequency of 65 MHz is obtained from the conversion table 40. Accordingly, the data transfer rate A will be 245 PBN (=65 MHz×24 bpp÷8×64÷54×1.06) (step S78).

Next, the setting unit 157 executes a resolution setting routine for the j-th display (the first display when j=1) (step S80). Next, the setting unit 157 determines whether the variable j is less than n (3) and the usable data transfer rate z is not less than the data transfer rate A (step S82). If it is determined that the variable j is less than n and the usable data transfer rate z is not less than the data transfer rate A, the setting unit 157 adds j to 1 (step S84), and performs step S80 again. If it is determined that the variable j is not less than n or the usable data transfer rate z is less than the data transfer rate A, the setting unit 157 determines that resolution changes of displays are completed, and terminates the processing.

<Resolution Setting Routine>

The resolution setting routine which is called at step S80 in FIG. 11C will be described with reference to a flowchart illustrated in FIG. 12. When the resolution setting routine is called, the setting unit 157 selects a display j (step S802). Next, the display controlling unit 158 displays a resolution selection menu (step S804). Next, the setting unit 157 determines whether a desired resolution is displayed on the resolution selection menu or not (step S806). If it is determined that the desired resolution for the display j is displayed on the resolution selection menu, the calculation unit 154 selects the desired resolution for the display j in accordance with the user's operation (step S808).

Next, the calculation unit 154 converts the resolution into a pixel clock frequency (which will be referred to as "x MHz") based on the conversion table 40 (step S810). When a resolution of "1920×1080 60 Hz 24 bpp" is selected from the resolution selection menu, the calculation unit 154 converts the above resolution into a pixel clock frequency of "148.5 MHz" based on the conversion table 40. The calculation unit 154 calculates a data transfer rate Y(1) PBN by substituting "148.5 MHz" in the above formula (1). When the pixel clock frequency obtained here is "148.5 MHz", the data transfer rate Y(1) PBN will be "559.7 PBN". The calculation unit 154 calculates a residual usable data transfer rate z. Here, the residual usable data transfer rate z becomes 2000.3 PBN (=2560−559.7).

Next, the display controlling unit 158 changes color of a portion of the bar graph representing the total data transfer rate. Specifically, in the bar graph, the portion extending from the left end to a position corresponding to the data transfer rate Y(j) is displayed in red, and the rest of the bar graph corresponding to the residual usable data transfer rate z is displayed in green (step S812). Next, the display controlling unit 158 changes color of a portion of the bar graph representing the data transfer rate of the first display. Specifically, in the bar graph, the portion extending from the left end to a position corresponding to the data transfer rate Y(j) is displayed in red, and the rest of the bar graph is displayed in green (step S814). After step S814, the processing terminates.

As a result, as illustrated in FIG. 13, in a PBN display region 170 of the screen "(a)", with respect to the bar graph 171 representing the total data transfer rate of 2560 PBN, color of the left side portion (172) corresponding to the data transfer rate Y(j) "559.7 PBN" turns into red. Also, the remaining portion of the bar graph 171 corresponding to the residual data transfer rate "2000.3 (=2560−559.7) PBN" remains in green.

Further, with respect to the bar graph 173 representing the data transfer rate of the first display, color of the left side portion (174) corresponding to the data transfer rate Y(j) "559.7 PBN" turns into red, and the remaining portion of the bar graph 173 remains in green. Therefore, a ratio of the data transfer rate currently in use to the total data transfer rate, and a ratio of the available data transfer rate to the total data transfer rate can be visually recognized. Also, with respect to the first display, a ratio of the data transfer rate currently in use to the total data transfer rate can be visually recognized. Accordingly, users can recognize displayable resolutions easily.

If, at step S806, it is determined that the desired resolution is displayed on the resolution selection menu, the setting unit 157 determines whether a resolution existing in the resolution selection menu is set (step S830). If it is determined that a resolution existing in the resolution selection menu is set, the calculation unit 154 selects the resolution in accordance with the user's operation (step S838). After executing steps S810 to S814, the processing terminates. For example, when a resolution of "1280×1280 60 Hz 24 bpp" is selected, at steps S810 to S814, a pixel clock frequency corresponding to the selected resolution and a data transfer rate Y(j) PBN are calculated, and the color of a portion of the bar graph corresponding to the data transfer rate in use is changed to red (steps S810-S814).

If, at step S830, it is determined that a resolution existing in the resolution selection menu is not set, the setting unit 157 determines whether the variable is not less than 2 (step S816). If it is determined that j is less than 2, the setting unit 157 suspends the resolution setting (step S820). If it is determined that j is not less than 2, the setting unit 157 subtracts 2 from the variable j, and the processing reverts to the previous display setting (step S818).

Referring back to step S82 in FIG. 11C, the setting unit 157 determines, at step S82, that the variable j is less than 3 and the residual usable data transfer rate z (2033 PBN) is not less than a data transfer rate A calculated at step S78 (245 PBN). The setting unit 157 adds j to 1 (step S84), and executes step S80 again to perform a resolution setting process of the second display.

Regarding the second display, the setting unit 157 sets a resolution of the second display in accordance with the user's operation, among resolutions which exist in the resolution selection menu. For example, if a resolution of "2560×1600 60 Hz (RB) 24 bpp" is selected, a pixel clock frequency corresponding to this resolution turns out to be 268.5 MHz from the conversion table 40. Hence, a data transfer rate Y(2) calculated by the calculation unit 154 will be "1011.94 PBN (=268.5 MHz×24 bpp+8×64÷54×1.06)", and the residual usable data transfer rate z will be calculated as "988.36 PBN (=2000.3 PBN−1011.94 PBN)".

As a result, as illustrated in FIG. 13 (see a screen "(b)"), with respect to the bar graph representing the total data transfer rate, color of the left side portion (172) corresponding to the data transfer rate of 1571.64 PBN (=559.7 PBN+1011.94 PBN) is changed to red by the display controlling unit 158. Also, the display controlling unit 158 displays a bar graph representing the data transfer rate of the second display, such that a left end of a portion 177, corresponding to the data transfer rate Y(2) displayed in red, is aligned with a right end of a portion 174 of the bar graph representing the data transfer rate of the first display, corresponding to the data transfer rate Y(1) displayed in red.

Also with respect to the third display, similar display control of a bar graph is performed. At step S82 in FIG. 11C (just after the resolution setting process of the second display is completed), the variable j is less than 3 and the residual usable data transfer rate z (988 PBN) is not less than the data transfer rate A (245 PBN). Hence, the setting unit 157 adds 1 to the variable j (step S84), and executes step S80 again to perform a resolution setting process of the third display.

The setting unit 157 sets a resolution of the third display in accordance with the user's operation, among resolutions which exist in the resolution selection menu. For example, if a resolution of "1920×1440 60 Hz 24 bpp" is selected, a pixel clock frequency corresponding to this resolution turns out to be 234.00 MHz from the conversion table 40. Hence, a data transfer rate Y(3) calculated by the calculation unit 154 will be "881.92 PBN (=234 MHz×24 bpp÷8×64÷54× 1.06)", and the residual usable data transfer rate z will be calculated as "106.44 PBN (=988.36 PBN−881.92 PBN)".

As a result, as illustrated in FIG. 13 (see a screen "(c)"), with respect to the bar graph representing the total data transfer rate, the color of the left side portion (172) corresponding to the data transfer rate of 2453.56 PBN (=1571.64 PBN+881.92 PBN) is changed to red by the display controlling unit 158. Also, the display controlling unit 158 displays a bar graph representing the data transfer rate of the third display, such that a left end of a portion 178, corresponding to the data transfer rate Y(3) displayed in red, is aligned with a right end of a portion 177 of the bar graph representing the data transfer rate of the second display, corresponding to the data transfer rate Y(2) displayed in red. The display controlling unit 158 displays the portion 178 corresponding to the data transfer rate Y(3) in red, and terminates the processing.

As described above, the display system in the present embodiment including multiple displays can calculate data transfer rates to be used for the multiple displays respectively, calculate a ratio of a sum of the data transfer rates to the maximum data transfer rate of 21.64 Gbps, and display the ratio and the maximum data transfer rate in different colors. Since a data transfer rate is in proportion to a display resolution, a user can easily identify a displayable resolution of each display by looking at a graph representing a usage of a data transfer rate displayed in colors.

Further, the display control method according to the present embodiment can be embodied by adding the configurable resolution display application and the microcontroller to obtain and maintain the EDID information and the DPCD information. Therefore, since modification of drivers or OS is not required, the display system according to the present embodiment can be easily provided.

Note that, at step S804, the display controlling unit 158 does not need to display the resolution selection menu when the residual usable data transfer rate z is less than a predetermined threshold.

<Examples of Display Screen>

Figure 14:
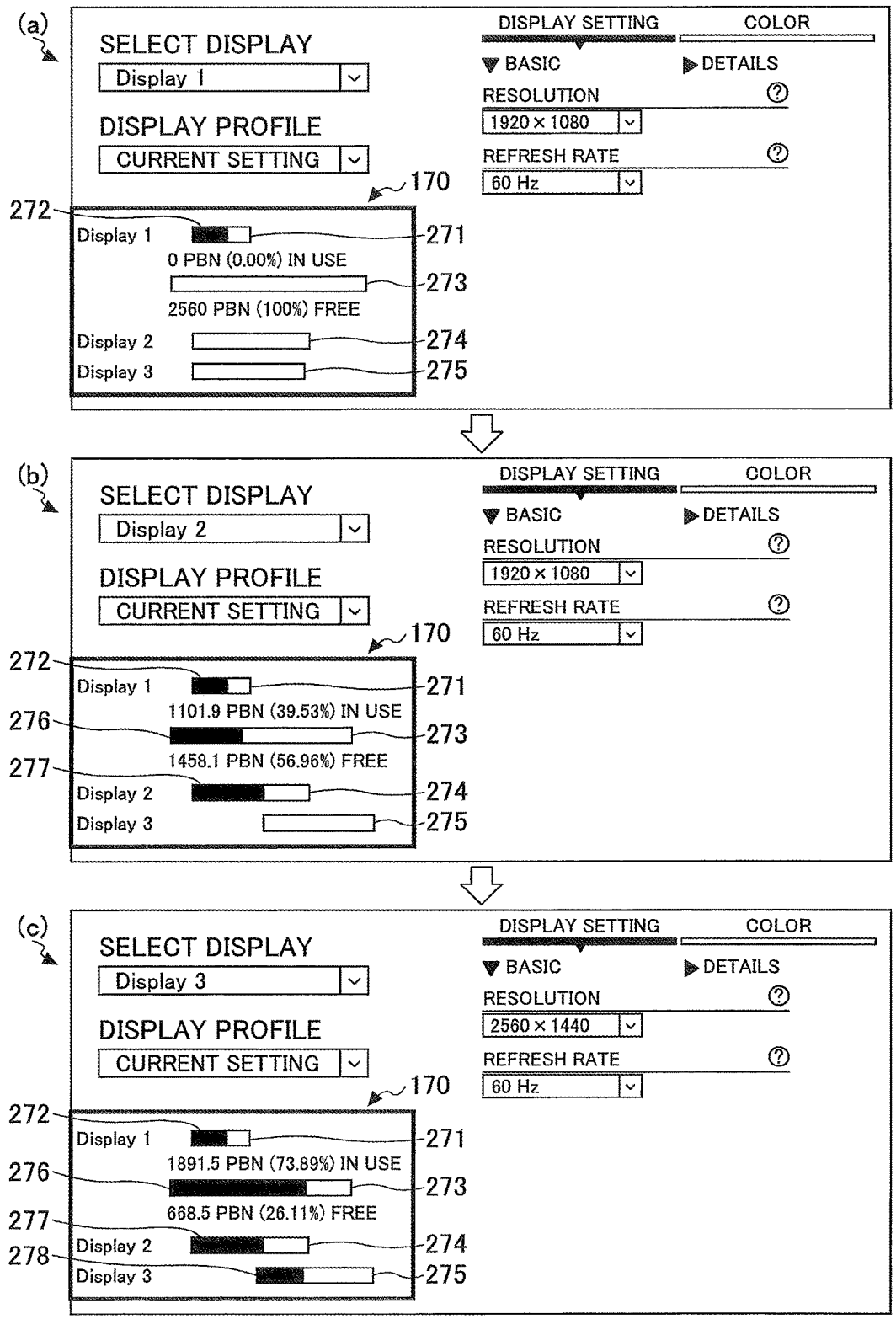
FIG. 14 is a view illustrating an example of a display screen according to the embodiment.
Figure 15:
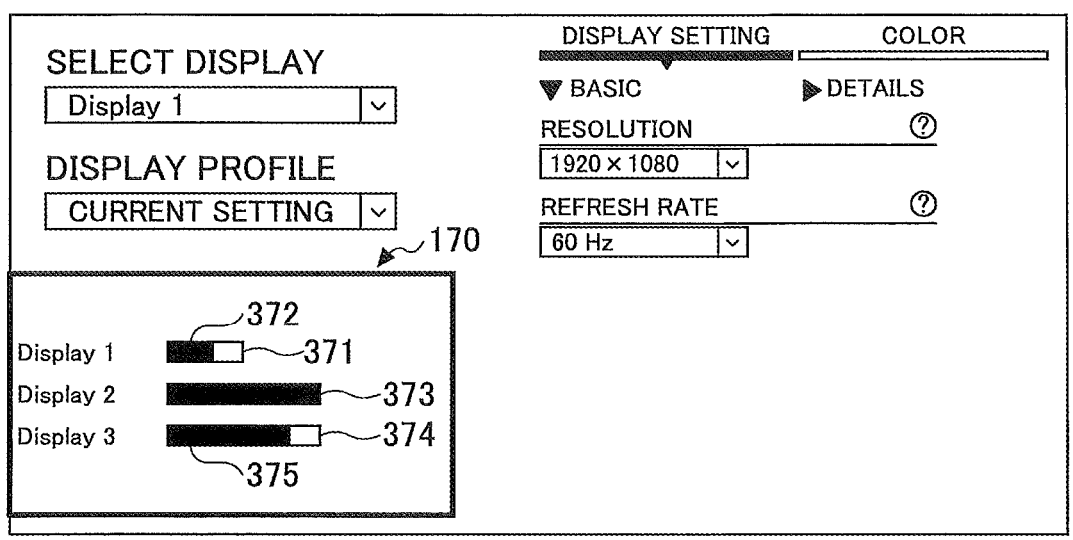
FIG. 15 is a view illustrating an example of a display screen according to the embodiment.

Other examples of display screens according to the present embodiment are illustrated in FIG. 14 and FIG. 15. FIG. 14 illustrates an example of a display screen used in a display system in which a first display is connected to a PC main unit 10 independently of a second display and a third display, and the second display and the third display are connected to the PC main unit 10 via a branch device 20. In this case, as illustrated on a screen "(a)" in FIG. 14, a data transfer rate of the first display is expressed as a bar graph independent of other graphs, which includes a red portion 272 and a green portion 271. In this example, how much percent of the allowable data transfer rate (displayable resolution) of the first display is in use can be displayed visibly.

Also, with respect to the second display and the third display, a bar graph 273 representing a total allowable data transfer rate, and individual graphs 274 and 275 each representing a data transfer rate of the second display and a data transfer rate of the third display, are displayed. Specifically, as illustrated in a screen "(b)" or "(c)" of FIG. 14, by displaying red bars 276, 277, and 278, and green bars 273, 274, and 275, allowable data transfer rates of the second display and the third display can be displayed visibly.

FIG. 15 illustrates an example of a display screen used in a display system in which a first, a second, and a third displays are connected to a PC main unit 10 independently of each other. A red bar graph 372 and a green bar graph 371 are displayed for representing a data transfer rate of the first display, a red bar graph 373 is displayed for representing a data transfer rate of the second display, and a red bar graph 375 and a green bar graph 374 are displayed for representing a data transfer rate of the third display.

As described above, the display system according to the present embodiment displays, when displaying a graph representing the total data transfer rate, how much percent of a total allowable data transfer rate (displayable resolution) is currently being used in a certain color (for example, in red), and displays a residual data transfer rate in a different color (for example, green). The display system according to the present embodiment also displays individual graphs respectively corresponding to each display juxtaposed with the graph representing the total data transfer rate, and displays in the individual graphs to what extent data transfer rates are used when resolution settings are performed. Hence, the display system according to the present embodiment can display residual data transfer rates of each display visibly. By using the display system according to the present embodiment, even a user, who does not know how to calculate a data transfer rate, can grasp a performance limit of a display. Accordingly, the number of inquiries or complaints regarding display resolution settings will be reduced.

The information processing system, the display control program, and the display control method are described in the above embodiment. However, the information processing system, the display control program, and the display control method according to the present invention are not limited to the embodiment described above. Various modifications or enhancement can be applied within the scope of the present invention. Further, multiple embodiments or modified examples can be combined as long as inconsistencies do not occur in the combination.

For example, the display system according to the present embodiment may be controlled by software instead of the microcontroller in the PC main unit 10. In this case, an interface for the software obtaining the AUX signal and the HPD signal is required in the display system. By storing, in the PC main unit 10, an application program configured to cause a CPU of the PC main unit 10 to perform the same functions as the functions which are embodied by the microcontroller in the embodiment described above, based on the AUX signal or HPD signal, and by executing the application program by the CPU of the PC main unit 10, the configurable resolution display processing according to the present disclosure can be performed without requiring the microcontroller.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing device configured to connect to a plurality of display devices using a function expansion unit comprising:
    a memory storing a program code and a conversion table maintaining resolutions of a display device associated with respective data transfer rates used by the display device; and
    a processor coupled to the memory configured to execute the program code to implement a process including:
        acquiring connection information of the plurality of display devices by snooping signals communicating between the information processing device and each of the plurality of display devices;
        identifying the number of the display devices connected to the function expansion unit and displayable resolutions of each of the display devices, based on the connection information;
        receiving each resolution to be used in a corresponding one of the plurality of display devices from a user;
        calculating a sum of data transfer rates to be used by the plurality of display devices from the resolutions received from the user, by using the conversion table;
        displaying a graph representing the sum of the data transfer rates to be used by the plurality of display devices and an unused data transfer rate; and
        displaying graphs representing ratios of the data transfer rates to be used by the identified display devices to respective allowable data transfer rates.

2. The information processing device according to claim 1,
    wherein, in calculating each of the data transfer rates, a refresh rate to be used in the corresponding one of the plurality of display devices is used in addition to a corresponding one of the resolutions.

3. A non-transitory computer-readable storage medium having stored therein a program for causing a processor of an information processing device to execute a display controlling process of a plurality of display devices connected to the information processing device using a function expansion unit, the information processing device including a conversion table maintaining resolutions of a display device associated with respective data transfer rates used by the display device, the display controlling process comprising:
    acquiring connection information of the plurality of display devices by snooping signals communicating between the information processing device and each of the plurality of display devices;
    identifying the number of the display devices connected to the function expansion unit and displayable resolutions of each of the display devices, based on the connection information;
    receiving each resolution to be used in a corresponding one of the plurality of display devices from a user;
    calculating a sum of data transfer rates to be used by the plurality of display devices from the resolutions received from the user, by using the conversion table;
    displaying a graph representing the sum of the data transfer rates to be used by the plurality of display devices and an unused data transfer rate; and
    displaying graphs representing ratios of the data transfer rates to be used by the identified display devices to respective allowable data transfer rates.

4. The non-transitory computer-readable storage medium according to claim 3,
    wherein, in calculating each of the data transfer rates, a refresh rate to be used in the corresponding one of the plurality of display devices is used in addition to a corresponding one of the resolutions.

5. A display control method of a plurality of display devices connected to an information processing device using a function expansion unit, the information processing device including a conversion table maintaining resolutions of a display device associated with respective data transfer rates used by the display device, the display controlling method comprising:
    acquiring connection information of the plurality of display devices by snooping signals communicating between the information processing device and each of the plurality of display devices;
    identifying the number of the display devices connected to the function expansion unit and displayable resolutions of each of the display devices, based on the connection information;
    receiving each resolution to be used in a corresponding one of the plurality of display devices from a user;
    calculating a sum of data transfer rates to be used by the plurality of display devices from the resolutions received from the user, by using the conversion table;
    displaying a graph representing the sum of the data transfer rates to be used by the plurality of display devices and an unused data transfer rate; and
    displaying graphs representing ratios of the data transfer rates to be used by the identified display devices to respective allowable data transfer rates.

6. The display control method according to claim 5, wherein, in calculating each of the data transfer rates, a refresh rate to be used in the corresponding one of the plurality of display devices is used in addition to a corresponding one of the resolutions.

* * * * *